United States Patent

[11] 3,594,516

[72] Inventor Frederick G. Storz
Elmburst, Ill.

[21] Appl. No. 784,804
[22] Filed Dec. 18, 1968
[45] Patented July 20, 1971

[73] Assignee GTE Automatic Electric Laboratories
Incorporated
Northlake, Ill.

[54] SEMICONDUCTOR MICROPHONE WITH CANTILEVER-MOUNTED SEMICONDUCTOR
8 Claims, 9 Drawing Figs.

[52] U.S. Cl. .......... 179/121 R, 179/110 B
[51] Int. Cl. .......... H04r 23/00
[50] Field of Search .......... 310/9.1; 317/235 W; 179/110 B, 110 A, 110 D, 110 F, 121 R

[56] References Cited

UNITED STATES PATENTS

| | | | |
|---|---|---|---|
| 3,312,790 | 4/1967 | Sikorski | 179/110.2 |
| 3,389,233 | 6/1968 | Krieger | 179/110.2 |
| 3,443,041 | 5/1969 | Kahng | 179/121 |

FOREIGN PATENTS

| | | | |
|---|---|---|---|
| 1,238,957 | 4/1967 | Germany | 179/110.2 |

OTHER REFERENCES

THE JOURNAL OF THE ACOUSTICAL SOCIETY OF AMERICA, " Experimental Tunnel-Diode Electromechanical Transducer Elements and their use in Tunnel-Diode Microphones," Rogers Vol. 34, No. 7, pp. 890—892, Aug. 6, 1962

*Primary Examiner*—Kathleen H. Claffy
*Assistant Examiner*—Jon Bradford Leaheey
*Attorneys*—K. Mullerheim, B. E. Franz and Cyril A. Krenzer

ABSTRACT: A semiconductor microphone includes a strip, on which a transistor is formed, mounted within the microphone case and coupled to a diaphragm by a rod. The strip, clamped to a member movably mounted within the case, is urged against the rod so as to flex the strip and stress a junction of the transistor. The diaphragm, in response to acoustical forces, moves the rod, modulating the stress on the transistor junction.

INVENTOR.
FREDERICK G. STORZ
BY
Leonard J. Kalinowski
AGENT

SEMICONDUCTOR MICROPHONE WITH CANTILEVER-MOUNTED SEMICONDUCTOR

FIELD OF THE INVENTION

This invention relates to electromechanical transducers and, more particularly, to a semiconductor microphone which employs a stress-sensitive semiconductor.

DESCRIPTION OF THE PRIOR ART

In prior art semiconductor microphones, such as the one shown in U.S. Pat. No. 3,435,157 issued to T. F. Longwell, a semiconductor junction is stressed directly by a pointed stylus. Since the sensitivity of the semiconductor to stress is most pronounced when the stress is applied at a point at or near a PN junction, to obtain optimum performance, it was necessary to position the stylus adjacent a PN junction, a tedious task because of the size of the body of semiconductor material.

Once constructed, the microphones were prone to damage by shock because the pointed stylus was mechanically biased against the surface of the semiconductor and, in response to forces due to mechanical shock, could penetrate the semiconductor and destroy it.

These problems are not as pronounced in an embodiment of a semiconductor transducer for use in a microphone shown in U.S. Pat. No. 3,312,790 issued to M. E. Sikorski which includes a cantilever-mounted semiconductor beam carrying a transistor. Static or variable forces applied to the free end of the beam cause the junctions of the transistor to be stressed thereby modifying the operating characteristics of the transistor. In another embodiment, a circular diaphragm, carrying a transistor at its center, has its center, and the transistor, clamped between a blunt rod and a support. A static force is applied to the transistor at the clamping point and variable forces are applied to the transistor through movement of the diaphragm. However, in both embodiments, the semiconductor strip is rigidly mounted relative to the stylus and the assembly is still prone to damage by shock forces. Moreover, no practical way is shown to apply the bias force required to permit the transistor to operate in a linear portion of its stress-sensitivity characteristic.

SUMMARY OF THE INVENTION

This invention provides a semiconductor microphone which minimizes the problems that characterized prior art semiconductor microphones. According to this invention, a transistor-bearing semiconductor strip is mounted movably with respect to a rod which couples the strip to a diaphragm. The resilient strip mounting provided by this invention simplifies the assembly of the microphone and the adjustment of the bias, and permits the microphone to be taken apart and reassembled without destroying or damaging any of its components. Moreover, this type of package minimizes the effects of shock forces on the semiconductor strip.

According to a preferred embodiment, a semiconductor strip is clamped in cantilever fashion to a pivotally mounted lever arm so that the strip extends parallel to the lever arm and to a diaphragm with the free end of the strip in contact with a rod which couples the diaphragm to the strip. As the free end of the lever arm is moved towards the diaphragm the clamped end of the strip moves with the lever arm while the free end of the strip is moved against the rod interposed between the strip and the diaphragm. The rod causes the strip to flex and thereby stresses the junctions of the transistor carried by the strip.

BRIEF DESCRIPTION OF THE DRAWINGS

A more thorough understanding of the invention will be gained from a consideration of the following detailed description in conjunction with the drawings in which.

DESCRIPTION OF PREFERRED EMBODIMENTS

Figure 1:
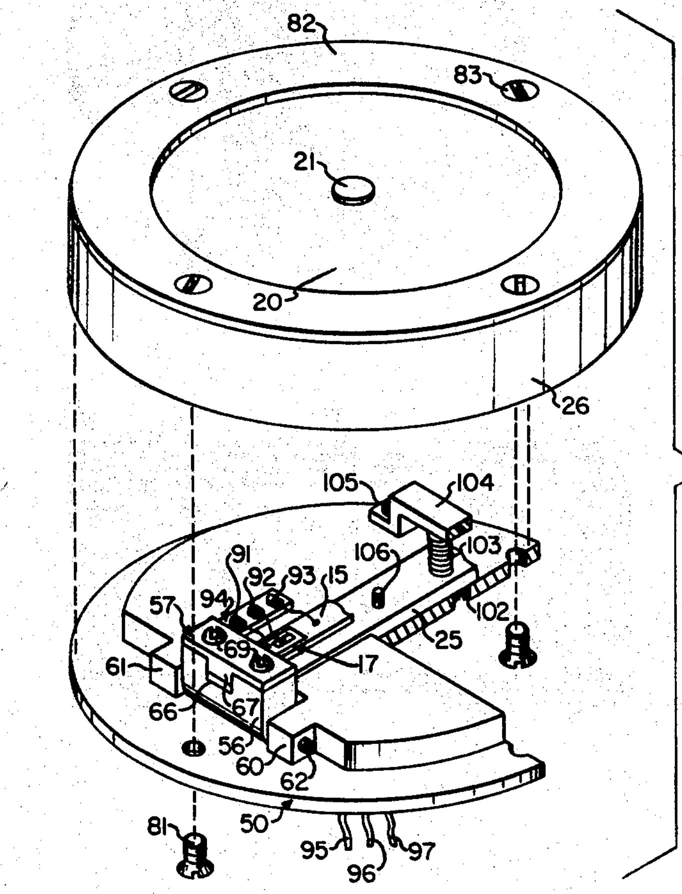
FIG. 1 is a perspective view of a semiconductor microphone, with the cover removed, according to one embodiment of the invention.
Figure 2:
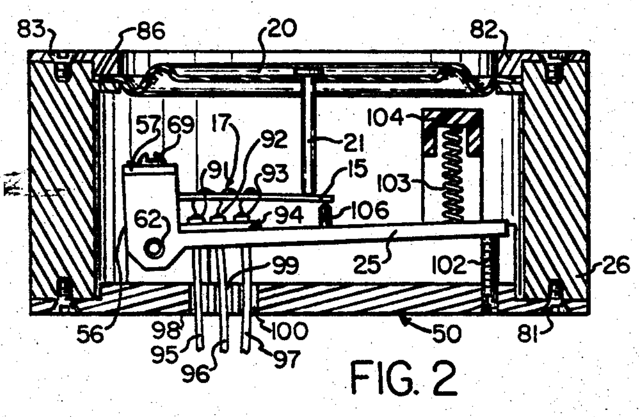
FIG. 2 is a side sectional view of the semiconductor microphone of FIG. 1.

Referring now to FIGS. 1 and 2, the semiconductor microphone according to the invention includes a transducing portion having a transistor 17 carried by a cantilever-mounted strip 15 and a diaphragm 20 coupled to the strip through a rod 21. The cantilever-mounted strip is, in turn, clamped to a lever arm 25 that is pivotally mounted on the microphone base 50. The lever arm which is more rigid than the strip, permits a static bias force to be applied to the strip, through a mechanical advantage, from a point away from the transistor. This static force is modulated by acoustic forces coupled to the transistor. The modulating stress is also applied to the transistor junctions from a point away from the transistor itself.

Figure 3A:
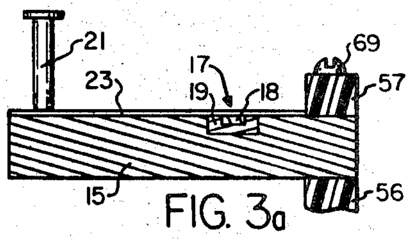
FIG. 3*a* is an enlarged view of part of the transducing portion of the semiconductor microphone of FIGS. 1 and 2 with the junctions unstressed.
Figure 3B:
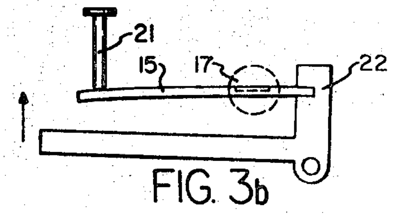
FIG. 3*b* shows the transducer of FIG. 3*a* with the junctions under tension.
Figure 3C:
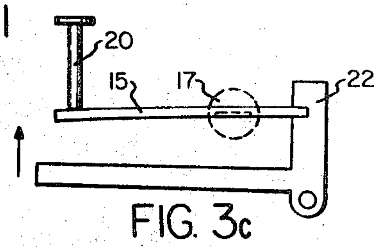
FIG. 3*c* shows the transducer of FIG. 3*a* with the junctions under compression.

An enlarged partial view of the transducing portion of the microphone is shown in FIG. 3*a*. The transistor 17 is formed integrally with the strip 15 which is of a semiconductor material such as silicon. The strip forms the collector of the transistor and an emitter region 18 and a base region 19 are produced in the strip, for example, by diffusion. The base junction extends less than 10 percent of the width of the strip 15, and the emitter junction extends to a corresponding lesser depth. The transistor junctions are shown in FIG. 3*a* on an enlarged scale for purposes of illustration, and while it is assumed a transistor is also formed integrally with the strip shown in FIGS. 1, 2, 3*b*, 3*c*, 6 and 7, the junctions are not shown because of their size relative to the other parts of the microphone. It should be apparent that the semiconductor could be made separate and be attached to the strip in such a way that its junctions would be stressed whenever the strip is flexed. In this latter case, the strip need not be of a semiconductor material.

The rod 21 has one end connected to a diaphragm 20 (shown in FIG. 1) and has its other end extending into contact with the free end of the silicon strip. Since the transistor is stressed indirectly, the rod does not have to be positioned close to a PN junction. Thus, positioning of the rod relative to the transistor junctions is not critical and the assembly of the microphone is simplified. Moreover, since according to the present invention, it is not necessary to etch the emitter regions of the transistor to increase their sensitivity to stress, the transistor used in the present invention may include a passivation layer 23, such as silicon oxide, covering the emitter, and base regions and the upper portion of the collector region, shown in FIG. 3*a*, to protect the semiconductor and extend its lifetime without affecting its operating characteristics.

Figure 4:
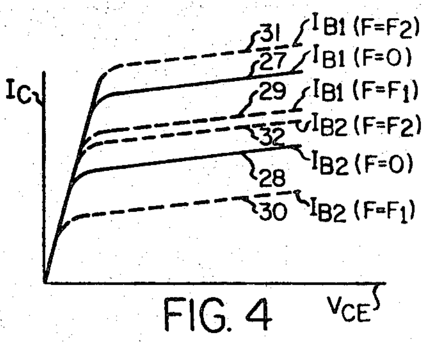
FIG. 4 is a plot of collector current versus collector-to-emitter voltage for various values of base current for the semiconductor used in the transducer shown in FIGS. 3*a*—3*c*.

In FIG. 3*a*, the silicon strip is shown to have no static force ($F=0$) applied to it and consequently, the transistor is not stressed. Plots of collector current $I_c$ versus collector-to-emitter voltage $V_{CE}$ for two values of base current $I_{B1}$ and $I_{B2}$ are shown in FIG. 4. Curves 27 and 28 represent the values of collector current for a given $V_{CE}$, based on two values of base current $I_{B1}$ and $I_{B2}$, when there is no force applied to the strip.

When the free end of the strip 15 is moved, as shown in FIGS. *3b* and *3c*, the transistor junctions experience a mechanical stress, resulting in a change in the electrical characteristics of the transistor. FIG. *3b* shows the transistor junctions under tension ($F=F_1$) and FIG. *3c* shows the strip inverted with the junctions on the bottom so that the junctions are under compression ($F=F_2$). The corresponding changes in the electrical characteristics of the transistor are shown graphically in FIG. 4. Curves 29 and 30 show collector current for a given base current when the transistor junctions are under tension and curves 31 and 32 show collector current for respective base currents when the transistor junctions are under compression. Microphone action is achieved by coupling the forces produced by acoustic waves directed toward diaphragm 20 to the strip 15 by means of the rod 21, whereby the stress on the junctions is modulated.

Since, when the static force is applied, the rod is always held against the strip, it is not necessary that the rod be attached to the strip. If desired, the rod may be mechanically attached to the strip; however, this would limit the repairability of the microphones.

Figure 5:
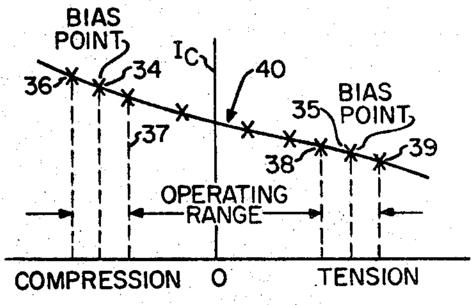
FIG. 5 is a plot of collector current versus deflection for the transducer shown in FIGS. 3*a*—3*c*.

FIG. 5 is a curve relating the collector current $I_c$ of the transistor to the amount of deflection of the silicon strip. From this curve it is apparent that the transistor can operate in either a tension or a compression mode as long as the portion of the operating curve is nearly linear. Thus, curve 40 has bias points 34 and 35 which exist in the compression and tension regions, respectively. In order to have the transistor operating in a linear region of the curve, the transistor is mechanically biased to near one of these two points to be operable over a fairly linear portion of the curve on either side of the bias point. For instance, in the tension region, the operating range extends between points 38 and 39 on curve 40, and in the compression region between points 36 and 37.

Referring now to FIG. 1 which shows a perspective view of the cantilever microphone, and FIG. 2, which shows a side sectional view of the microphone, the silicon strip 15 carrying the transistor 17 is pivotally mounted on the baseplate 50 by means of a two-piece strip clamp portion of the lever arm 25, which has a base 56 and a T-shaped clamp part 57. The clamp is pivotally mounted on the baseplate 50 by means of pin 62 which extends through apertures formed in the bottom part of the clamp base and in the shoulders 60 and 61 of the baseplate 50. The silicon strip extends parallel to the baseplate.

As best seen in FIG. 1, the upper portion of the clamp base has a slot 66 for receiving the end of the strip, and the other portion 57 of the clamp has a boss 67 which engages the strip, clamping it in the slot. The two parts of the clamp are held together by means of screws 69.

The transducing portion of the assembly is enclosed within the hollow cylindrical housing 26 and the baseplate 50, mounted over one of the open ends of the housing, is secured to the housing by screws 81. The baseplate and housing are made of aluminum.

The diaphragm 20 has its edge mounted on a ridge 86 of the housing at the other end of the housing, and is spaced apart from the baseplate 50 by the height of the housing when the microphone is assembled. The diaphragm may be made of plastic or aluminum, but is preferably of plastic since this material is less rigid than aluminum and will match more closely the stiffness of the strip 15. The diaphragm 20 is maintained in position by a clamp ring 82 secured to the housing by screws 83.

One end of rod 21 is attached to diaphragm 20 and extends into the housing with its other end engaging the strip 15 near its free end. The rod couples movements of the diaphragm to the strip to effect changes in the electrical characteristics of the transistor carried by the strip. Rod 21 is preferably made of aluminum to match the material of the case so that there will be no change in the applied stress due to temperature changes which might cause expansion or contraction of the parts of the microphone.

The base, the emitter, and the collector regions of the transistor are connected to terminals 91, 92 and 93, which are shown, for example, printed on a board 94 which is supported on the baseplate. These terminals are in turn connected to leads 95, 96, 97 which extend through apertures 98, 99 and 100 in the baseplate.

A static force is applied to the transistor junctions through the lever arm 25 which, in turn, is moved by a bias screw 102 threaded into the baseplate. Assuming the transducer is to operate in the tension mode of FIG. *3b*, the screw 102 is turned into the baseplate, manually, and the free end of the lever arm, which extends substantially parallel to diaphragm and the strip, is moved towards the diaphragm. Since the free end of the lever arm is an integral part of the strip clamp, the clamp is pivoted so that the strip carrying the semiconductor is also moved toward the diaphragm. However, since the free end of the strip is in contact with the rod attached to the diaphragm, the strip flexes, creating a stress on the semiconductor. The lever arm, on the other hand, is more rigid than the strip and consequently, will not flex. Leads 95—97 are connected to appropriate bias supplies and the collector current is monitored, and the screw is turned until the current reaches the value equivalent to operating point 35 shown in FIG. 5. Obviously, by inverting the strip, the transistor can be subjected to stress in the compression mode and could be biased to operating point 34.

A restraining spring 103 maintains the lever arm against the adjustment screw. A spring clamp 104 attached to the raised portion of the baseplate by screws 105 holds the restraining spring in place. While a coil spring is shown, other types, such as a leaf spring could be used. The force of the lever arm against the restraining spring is translated into a force applied to the strip sufficient to hold the strip against the rod. Thus, the various parts of the transducing portion of the microphone do not have to be rigidly affixed to one another with epoxy or glue so that the microphone can be assembled and disassembled easily.

As shown in FIG. 1, the length of lever arm 25 is approximately twice the length of strip 15. Thus, when the bias screw 102 is adjusted, a mechanical advantage is obtained which permits an accurate and smooth adjustment for the bias point as the adjustment screw is turned.

A deflection limit screw 106 attached to the upper surface of the lever arm prevents excess deflection, due to mechanical shock, of the silicon strip 15 relative to the lever arm 25, preventing damage to the transistor.

Figure 6:
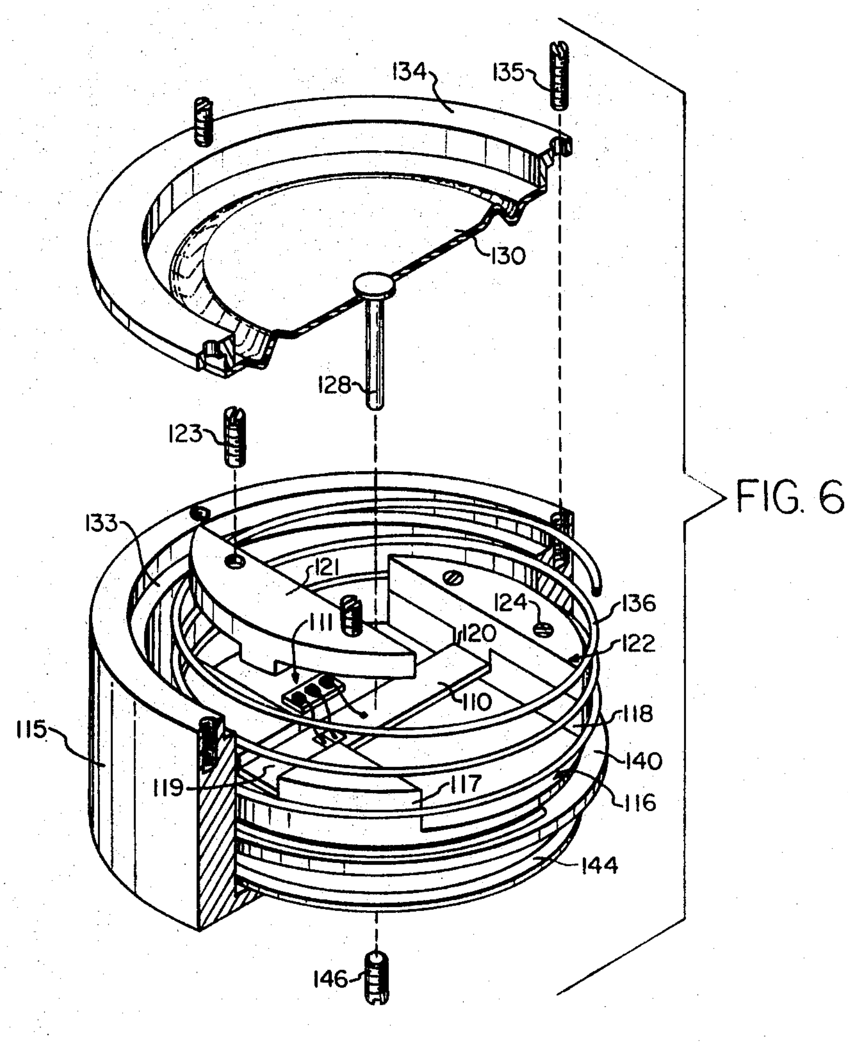
FIG. 6 is a partially exploded perspective view of a semiconductor microphone, according to a second embodiment.
Figure 7:
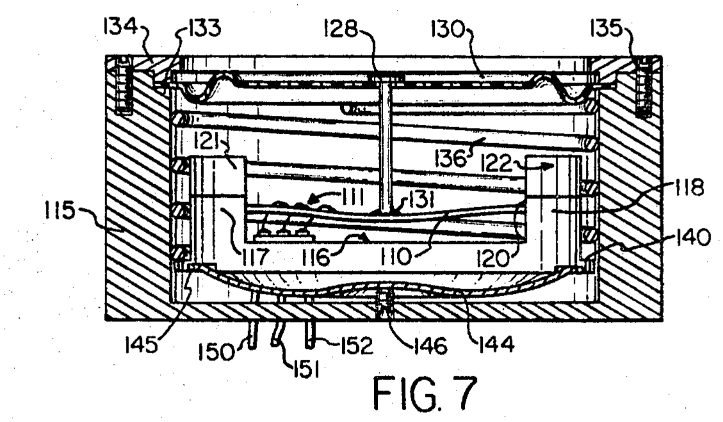
FIG. 7 is a side sectional view of the semiconductor microphone shown in FIG. 6.

An alternative embodiment of a semiconductor microphone is shown in FIGS. 6 and 7. A strip 110 of silicon material bearing transistor 111, similar to the strip 15 shown in FIG. *3a*, has both ends clamped to a mounting plate 116 which is slidably movable along the inner walls of a hollow cylindrical case 116 against the force of restoring spring 136.

The mounting plate 116 includes two raised mounting portions 117, 118 each having a channel 119, 120, respectively, for receiving the ends of the strip, and substantially T-shaped members 121, 122 fastened to the mounting portions by screws 123, 124 clamp the strip to the mounting plate.

A rod 128, attached to a plastic diaphragm 130, extends into the case and contacts the strip near its center. In this embodiment, the rod is shown attached to the strip by a suitable adhesive 131, such as epoxy. It should be understood, however, that this is by way of example only and that the rod need not be secured to the strip.

The edge of the diaphragm rests on the ridge 133 and is secured to the case by a clamp ring 134 fastened to the case by screws 135. One end of coiled restoring spring 136, interposed between the mounting plate and the diaphragm, rests upon a flange 140 of the mounting plate and encircles the raised mounting portions 117, 118, and the other end engages the diaphragm near its edge.

A static force is applied to the strip by moving the mounting plate, against the force of the spring 136, toward the diaphragm whereby the rod, attached to the diaphragm and interposed between the diaphragm and the strip, will cause the strip to flex, thereby introducing a stress on the transistor junctions.

The mounting plate is moved through the coaction of a contoured disc 144, having its edge positioned in a groove 145 in the mounting plate, and a bias screw 146 threaded into the case adjacent the center of the disc 144.

To apply a static force to the strip, the bias screw 146 is manually turned into the case, moving the disc 144 and the mounting plate toward the diaphragm. Since the diaphragm is more rigid than the strip, the rod 128, interposed between the diaphragm and the center of the strip, will cause the strip to bend as the mounting plate is moved toward the diaphragm.

Leads 150—152, which are connected to the base, the emitter, and the collector regions of the transistor 111 carried by the strip 110 extend through the case and are connected to appropriate bias supplies so that the collector current of the transistor can be monitored as the static force is applied.

From the foregoing, it is apparent that this invention has provided a semiconductor microphone having a mounting arrangement for a stress-sensitive semiconductor which simplifies the manner in which the required static bias force is applied to the semiconductor. The assembly of semiconductor microphones which use the principles of this invention is simpler than the assembly of prior art semiconductor microphones and the type of package afforded in accordance with this invention inherently minimizes the effects of shock forces on the semiconductor.

What I claim is:

1. A semiconductor microphone comprising:
- a hollow case having an open end;
- a diaphragm mounted on said case over said open end;
- a lever arm, pivotally mounted on said case and extending substantially parallel to said diaphragm;
- an elongated strip including a transistor having a stress-sensitive PN junction, said strip being mounted in cantilever fashion on said arm with one end of said strip clamped to said arm;
- a rod having one end attached to said diaphragm and its other end extending into said case and into contact with said strip at a point away from said transistor;
- and bias means engaging said lever arm for applying a static force to said strip to stress said junction;
- said diaphragm being responsive to acoustic forces to move said rod, superimposing a dynamic stress on said static force whereby the electrical characteristics of said transistor are altered.

2. A semiconductor microphone as claimed in claim 1, wherein said strip is of a semiconductor material and said transistor is formed in said strip, said transistor having a layer of passivation material covering its emitter and base regions.

3. A semiconductor microphone as claimed in claim 1, and further including means carried by said lever arm and positioned between said lever arm and said strip to limit the deflection of said strip relative to said lever arm.

4. A semiconductor microphone as claimed in claim 1, wherein said bias means comprises a manually adjustable screw threaded in said case adjacent the free end of said lever arm, said screw, when turned into said case pivoting the fixed end of said arm and moving the free end of said arm toward said diaphragm, whereby the free end of said strip is moved against said rod, and restraining means urging said arm against said screw.

5. A semiconductor microphone as claimed in claim 4, wherein the length of said lever arm is substantially twice the length of said strip whereby a mechanical advantage is provided from the inward movement of said screw to the movement of said strip to permit a sensitive adjustment of the static force on said strip.

6. A semiconductor microphone comprising:
- a hollow case having an open end;
- an elongated strip including a transistor having a stress-sensitive PN junction;
- a mounting plate slidably movable along an inner wall of said case, said mounting plate being adapted to clamp said strip at both ends;
- a diaphragm mounted on said case over said open end;
- a rod having one end attached to said diaphragm and its other end extending into said case and into contact with said strip at a point away from said transistor;
- and bias means engaging said mounting plate for applying a static force to said strip to stress said junction;
- said diaphragm being responsive to acoustic forces to move said rod, superimposing a dynamic stress on said static force whereby the electrical characteristics of said transistor are altered.

7. A semiconductor microphone as claimed in claim 6, wherein the rod has its other end mechanically attached to the strip.

8. A semiconductor microphone as claimed in claim 6, wherein said bias means includes means for manually moving said mounting plate toward said diaphragm and a coiled restoring spring, interposed between said mounting plate and said diaphragm and encircling said mounting plate, urging said mounting plate away from said diaphragm.